US006226005B1

(12) United States Patent
Laferrière

(10) Patent No.: US 6,226,005 B1
(45) Date of Patent: May 1, 2001

(54) METHOD AND SYSTEM FOR DETERMINING AND/OR USING ILLUMINATION MAPS IN RENDERING IMAGES

(76) Inventor: Alain M Laferrière, 4837 Garnier, Montreal, Quebec (CA), H2J 3S8

( * ) Notice: Subject to any disclaimer, the term of this patent is extended or adjusted under 35 U.S.C. 154(b) by 0 days.

(21) Appl. No.: 08/946,053

(22) Filed: Oct. 7, 1997

Related U.S. Application Data

(63) Continuation-in-part of application No. 08/905,198, filed on Aug. 1, 1997, now abandoned, and a continuation-in-part of application No. 08/792,596, filed on Jan. 31, 1997, now abandoned.

(51) Int. Cl.$^7$ .................................................. G06T 15/50

(52) U.S. Cl. ............................ 345/426; 345/430; 345/431

(58) Field of Search ................................... 345/426, 431, 345/430

(56) References Cited

U.S. PATENT DOCUMENTS

| 5,734,385 | * | 3/1998 | Mima ................................... | 345/426 |
| 5,854,632 | * | 12/1998 | Steiner ................................. | 395/426 |

FOREIGN PATENT DOCUMENTS

| 0 506 429 A2 | 9/1992 | (EP) . |
| 0 751 486 A2 | 1/1997 | (EP) . |
| 0 856 815 A3 | 1/1999 | (EP) . |

OTHER PUBLICATIONS

"Advanced Animation & Rendering Techniques: Theory & Practice": Alan Watt & Mark Watt; Addison–Wesley; Section 14.1, 1992.*

"Computer Graphics": Donald Hearn & Pauline Baker;Prentice Hall; Sections 10.1, 14.2, 14.5, 1994.*

(List continued on next page.)

*Primary Examiner*—Mark Zimmerman
*Assistant Examiner*—Mano Padmanabhan
(74) *Attorney, Agent, or Firm*—Gowling Lafleur Henderson LLP

(57) ABSTRACT

A system and method of determining, and subsequently using in a rendering engine, an illumination map. The illumination map is employed by the rendering engine to avoid having to calculate the contributions of lights in the scene during rendering, thus reducing the rendering time. In one embodiment, the system and method is used to determine the illumination values from the contribution of one or more lights to one or more texture mapped objects. This illumination map can either be stored independently of the texture picture to be mapped or can be combined with the texture picture to obtain an illuminated texture picture for subsequent rendering independent of the light sources. In another embodiment, the present invention is used to determine the illumination values for one or more objects represented by a polygon mesh. This illumination map can be stored independent of the material and color of the object or can be combined with the color and material information and stored in the object definition. In either of these cases, this illumination map represents the illumination values at the vertices of the polygons, the rendering engine and/or hardware linearly interpolating the remainder of the rendering information for each polygon. The illumination values can be determined either by summing the contribution of the lights in a scene at points of interest or by evaluating the entire shade tree defined for the scene at those points of interest. In this latter case, the contributions of reflections, refractions, transparencies and any procedural functions defined for the scene are considered in determining the illumination values. Evaluation of the entire shade tree also allows other options, such as the ability to generate 2D textures from procedural 3D textures or to generate a texture that contains the result of a blending between multiple textures.

16 Claims, 12 Drawing Sheets

OTHER PUBLICATIONS

On Line Computer Graphics Notes on the World Wide Web, at http://muldoon.cs.ucdaivs.edu/GraphicNotes/Barycentric–Coordinates/Barycentric–coordinates.html, (Pub) University of California at Davis, Dec. 9, 1996.

Excerpt from "Polygonal Modelling in Alias", pp. 101–103, 1996.

Product Brochure for Alias/Wavefront, "Power Animator for Games & Interactive Media", May 1996.

* cited by examiner

METHOD AND SYSTEM FOR DETERMINING AND/OR USING ILLUMINATION MAPS IN RENDERING IMAGES

RELATED APPLICATIONS

This application is a continuation in part of U.S. patent application Ser. No. 08/792,596, filed Jan. 31, 1997 and of U.S. patent application Ser. No. 08/905,198, filed Aug. 1, 1997, both now abandoned, each of which applications are assigned to the assignee of the present invention.

FIELD OF THE INVENTION

The present invention relates to a method and system for rendering images. More particularly, the present invention relates to a system and method of determining illumination maps for use in the rendering of images and to a rendering engine employing such illumination maps.

BACKGROUND OF THE INVENTION

Rendering engines for creating images are well known. Such engines accept a definition of an image to be produced, often referred to as a scene definition, and create an image therefrom for storage and/or output on a suitable output means. One such rendering engine is the "mental ray" engine, included with the SoftImage|3D product sold by the assignee of the present invention and which can produce high quality, photo-realistic images.

One of the problems with rendering engines for high quality images is the computational complexity in rendering such an image, resulting in substantial times being required to render each image. While special rendering hardware and/or distributed processing systems are often employed to reduce rendering times, long rendering times remain a problem, especially when it is desired to render images in real time and/or to render images on lower cost systems, or on games systems such as the SEGA Saturn, Sony PlayStation and Nintendo 64 systems which have limited rendering hardware and yet have sophisticated rendering needs.

Known rendering engines, such as the above-mentioned "mental ray" renderer in SoftImage|3D, take a scene definition as input and produce a corresponding rendered image as an output. Such scene definitions can include geometric definitions for various 3D objects and their locations within the scene, the material characteristics of these objects (i.e.—surface roughness, color, transparency, etc.), the number, location and color of lights within the scene, the viewpoint and position from which the scene is viewed, usually referred to as the camera point of view, etc. In SoftImage|3D, and other systems, the factors which need to be considered for shading in the rendering of the scene are arranged in a structure called a "shade tree". Information on shade trees can be found in various publications, including in "Advanced Animation and Rendering Techniques, Theory and Practice", Chapter 14, by Alan Watt and Mark Watt, 1992, ACM Press, the contents of which are incorporated herein by reference. In the "mental ray" renderer, various predefined or user defined procedural functions, referred to as "mental ray shaders", can be defined and included in the shade tree to allow special rendering effects to be incorporated in the rendering process. "mental ray shaders" can be attached to various scene elements including: materials, textures, lights, etc., as desired.

In systems such as SoftImage|3D, it is known to reduce the computational complexity of rendering many 3D objects by tessellating 3D objects to obtain a polygon mesh representation of the defined 3D object and rendering the polygons in that mesh to obtain a reasonable approximation of the 3D object. For example, a sphere can be represented by a mesh of triangular polygons which closely model the sphere, the degree of correspondence between the mesh and the object generally being determined by the number of polygons in the mesh.

In SoftImage|3D the polygons used in the tessellation meshes to represent objects comprise triangular polygons as this is preferred for efficiency and simplicity and the following discussion primarily relates to such tesselated polygon meshes. However, as will be apparent to those of skill in the art, the present invention is not limited to use with meshes of triangular polygons and can be employed with polygons with more sides if desired. The conversion of an object to a tesselated representation is well known and will not be described further herein.

Rendering of objects represented by polygon meshes can be performed by scan line or ray tracing. In ray tracing, a final color is determined at each pixel of the rendered image by "firing" a light ray from the pixel to determine the reflections, refractions, mental ray shaders, etc. which contribute to the final color. While computationally expensive, ray tracing can produce very realistic results.

In scan line rendering, a determination is made at each pixel as to which objects are in front or behind the current pixel (depth-sorting) to determine whether they are "visible". Visible objects are displayed and non-visible objects are omitted. While scan line rendering is less computationally expensive, and is often supported by special purpose graphics hardware, it generally results in renderings of lower quality than ray tracing.

Part of the evaluation of a shade tree, in both scan line and ray trace rendering is the determination of vertex shading. In vertex shading, a final color is determined, by scan line or ray tracing, only at the vertices of each polygon which will be visible in the rendered image. The determined final colors are then linearly interpolating across the balance of the polygon. The rendered final colors at the vertices are determined from the vertex normals relative to the light sources, the defined surface characteristics, etc. Commonly, rendering hardware includes functions to perform the linear interpolation for the balance of the polygon, given the vertex colors.

While the modeling of objects with polygon meshes can reduce rendering complexity, the calculation of vertex color information by either means, but especially by ray tracing, is still computationally expensive.

Another common feature in rendered images is the use of texture mapped surfaces. Texture mapping a surface or object comprises projecting a two dimensional texture (a picture) onto objects and/or surfaces and, as with other objects, texture mapped objects are often represented as tesselated objects for rendering purposes. Texture pictures can include any pattern or image, for example photographic images of celebrities, patterns to represent woodgrain, marble, etc. and generally assist in obtaining a realistic final image or desired special effect. However, when rendering texture mapped objects and surfaces the rendering process, whether scan line, ray tracing or another rendering process, must consider each polygon or portion of a polygon in the tessellation mesh which will affect rendering of a pixel in the texture picture and this is also computationally expensive.

It is desired to have a system and method which allows for rendering engines to produce images of a desired quality with reduced rendering times.

SUMMARY OF THE INVENTION

It is an object of the present invention to provide a novel system and method to render images which obviates or mitigates at least one disadvantage of the prior art.

According to a first aspect of the present invention, there is provided a method of producing an illumination map for at least one object in a scene to be rendered, the object to be texture mapped and the object being represented as a mesh of polygons, comprising the steps of:

(i) selecting a texture picture to be mapped to said object and representing said texture picture and said mesh of polygons in a common coordinate system;

(ii) determining the location of, area of and weight of the intersection between each pixel in said texture map and each polygon in said polygon mesh, the weight corresponding to the proportion of said area of intersection relative to the total area of said pixel;

(iii) for each determined area of intersection, determining the product of illumination information at said determined location of intersection and the weight of said area of intersection;

(iv) summing each product determined in step (iii) for each respective pixel to obtain an illumination value; and (v) storing said illumination value for each said pixel.

In a preferred aspect, the illumination information in step (iii) is determined by evaluating the components within a shade tree defined for the scene. In another preferred aspect, the illumination information in step (iii) is determined by determining the sum of each light value for each light defined for said scene at said determined location of intersection.

According to another aspect of the present invention, there is provided a method of producing an illumination map for at least one object in a scene to be rendered, the object being represented as a mesh of polygons, comprising the steps of:

(i) selecting said at least one object;

(ii) determining the vertices and vertex normals for each polygon in said mesh of polygons for said object;

(iii) determining for each vertex of each polygon an illumination value; and (iv) storing said illumination value for each said vertex.

In a preferred aspect, the illumination information in step (iii) is determined by evaluating at said determined location of intersection the components within a shade tree defined for the scene. In another preferred aspect, the illumination information in step (iii) is determined by determining the sum of each light value for each light defined for said scene at said determined location of intersection.

According to yet another aspect of the present invention, there is provided a method of determining an illumination map to be used in rendering a scene definition to obtain an image, comprising the steps of:

(i) determining from a scene definition the number of and location of each light source defined for the scene;

(ii) determining from said scene definition the location of each object in said scene and representing said object as a tessellated polygon mesh;

(iii) determining an illumination value at points of interest on each said object; and (iv) storing said illumination value an illumination map for said scene definition.

According to yet another aspect of the present invention, there is provided a system for producing illumination maps for use in rendering images from a scene description, comprising:

means to determine from a scene definition the number of and location of each light source defined for the scene;

means to determine from said scene definition the location of at least one object in said scene and to represent said at least one object as a tessellated polygon mesh;

means to determine an illumination value at points of interest on said at least one object; and means to store said determined contributions in an illumination map for said scene definition.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
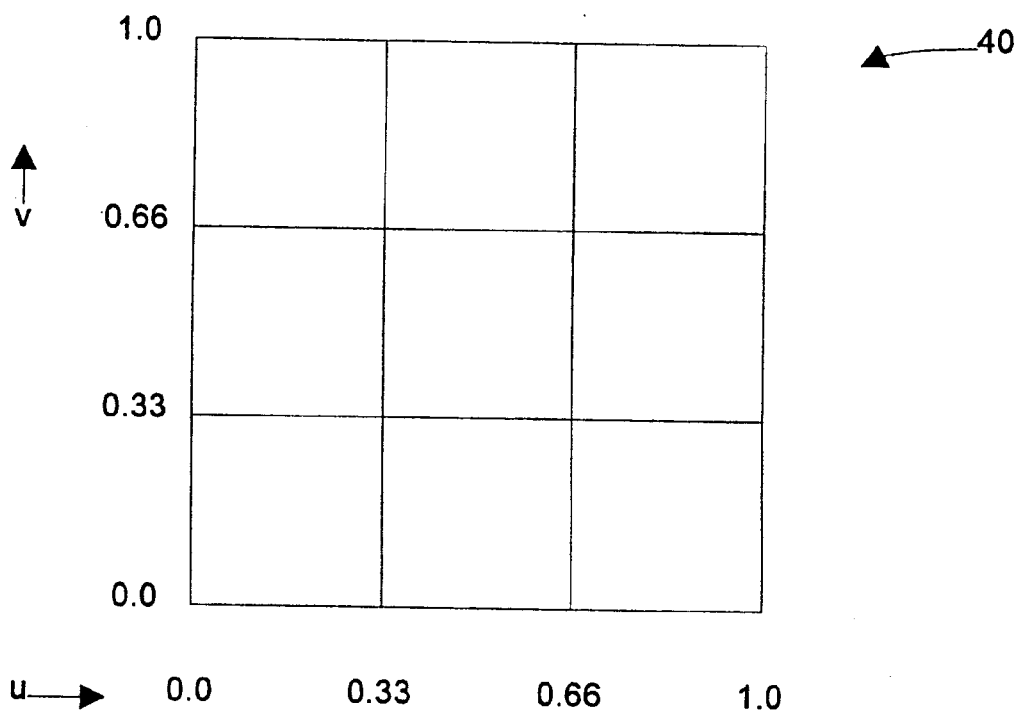
FIG. 1 shows a schematic representation of a three by three pixel texture picture in uv space.

The present invention provides for the calculation of an illumination map, either by determining the contributions of each light source in a scene or by performing a complete evaluation of all of the active components of a shade tree defined for the scene. As used herein, a "shade tree" is intended to comprise any suitable data structure in which the components which are to be considered by a rendering engine in producing a rendered image are stored. Further, it is contemplated that such a shade tree can include a variety of components, only some of which are "active" at a particular time. For example, a shade tree can have various components which relate to specular color information, but these components can be inactive when a user instructs the rendering engine to ignore specularities.

An illumination map represents the illumination information at points of interest in a scene which is to be rendered, and this illumination map can then be employed by the rendering engine to obtain the final rendered image. In such a case, the rendering engine renders the scene without further considering the effect of the light sources defined for the scene on any object for which an illumination map is defined and this results in a less computationally complex rendering and thus a reduced rendering time.

An illumination map is independent of the camera point of view and therefore, an illumination map determined for an object is useful in rendering that object in any image wherein the light sources or other shade tree components used in determining the illumination map do not change. Thus, by employing a predetermined illumination map, the processing time for the rendering engine to subsequently render an image is reduced, allowing the rendering engine to either process the scene definition faster or to process a more complex scene in a given time.

Further, illumination maps are independent of the materials of polygons and/or the texture pictures used in texture mapping. Thus, once an illumination map is determined, the material of objects and or texture pictures can be changed and rendered as desired without the need to determine a new illumination map.

In general, the production of an illumination map requires the determination of the points of interest within the scene and the determination of an illumination value within the scene at these points of interest. For non-texture mapped objects, the points of interest correspond to the vertices of the polygons in the mesh representing the object. For texture mapped surfaces, the determination of the points of interest is more complex and is discussed first herein, with a discussion of the simpler case of non-texture mapped polygon meshes following.

With this embodiment of the present invention for texture mapped surfaces, the user selects one or more texture maps for which it is desired to determine illumination values. In SoftImage|3D, this selection can be accomplished by selecting one or more texture nodes in the schematic view of the scene definition, although any other suitable method of selecting a texture picture to be considered can also be employed, as will be apparent to those of skill in the art. Next, the object or objects to which the texture picture is to be mapped are converted to polygon mesh representation, if they are not already represented as such, using a suitable tessellation algorithm.

In the above-mentioned SoftImage 3|D system and other systems, texture mapping can be performed by projection or by uv mapping (i.e—in uv space). If projected, either planar, cylindrical or spherical projections can be employed and a discussion of such projection techniques is given in the above-mentioned "Advanced Animation and Rendering Techniques, Theory and Practice" by Watt & Watt, the contents of which are incorporated herein by reference. If uv mapping is employed, the texture picture is represented in, or converted to, uv coordinate space, wherein 'u' represents the horizontal axis of the texture picture and ranges from 0.0 to 1.0 and 'v' represents the vertical axis and also ranges from 0 to 1.0. The coordinates of the polygon(s) which are to be uv texture mapped are converted from xyz space to uv space, if they are not already expressed in uv coordinates, and the mapping is then performed.

FIG. 1 shows a schematic representation of a texture picture 40 with a resolution of three pixels by three pixels. As will be apparent to those of skill in the art, this size of texture picture has been selected for clarity of discussion and generally texture pictures of much larger dimension are employed in actual use.

Figure 2:
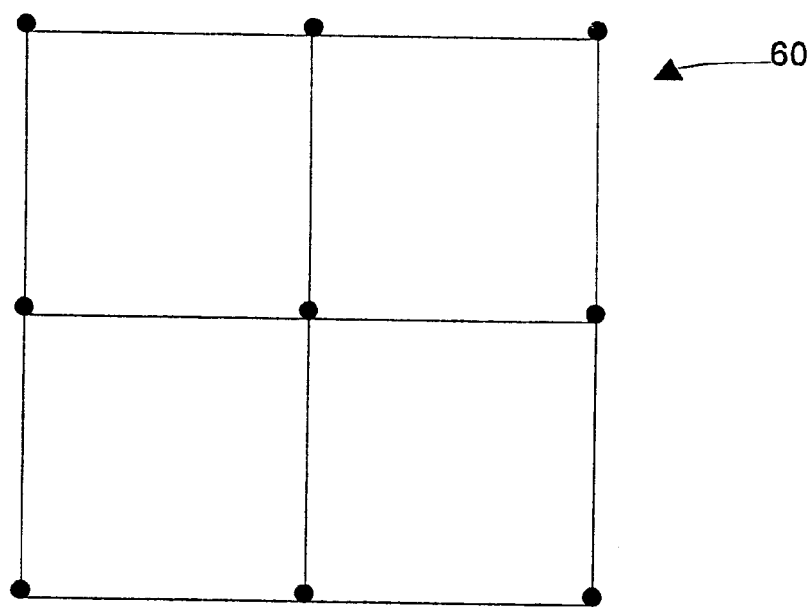
FIG. 2 shows a schematic representation of a planar object comprising four polygons in a two by two arrangement.

FIG. 2 shows a schematic representation of a 3D object 60, in this case a polygon mesh comprising four polygons. Again, as will be apparent to those of skill in the art, object 60 has been selected for clarity and 3D objects of greater complexity can and will be used with the present invention. For example, the 3D object can be a polygon mesh, a nurbs or a patch surface, etc.

Figure 3:
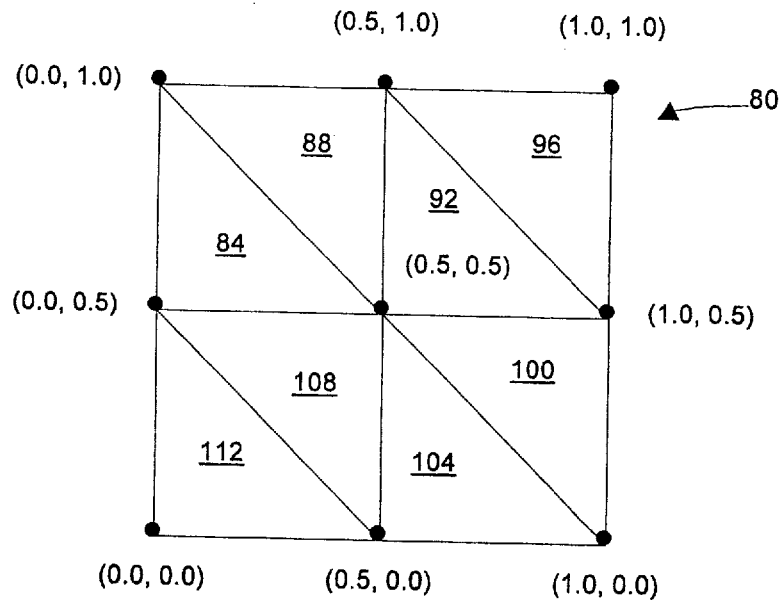
FIG. 3 shows a schematic representation of a tesselated polygon mesh employed to represent the object of FIG. 2 in uv coordinate space.

FIG. 3 shows the result of converting polygon 60 to a tesselated representation 80 in uv space wherein the object is represented by eight triangular polygons, 84 through 112, and the coordinates of the vertices of each triangle are shown in uv space.

Figure 4:
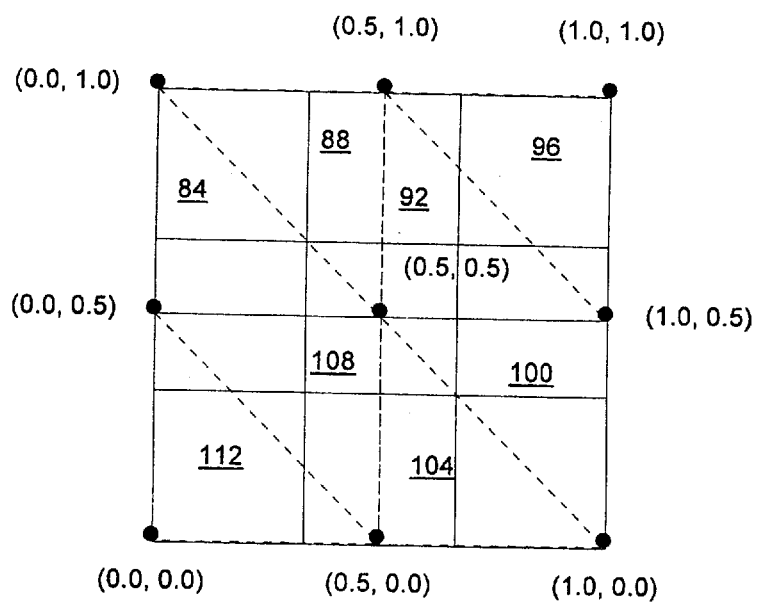
FIG. 4 shows a schematic representation of a projection of the texture picture of FIG. 1 onto the tesselated polygon mesh of FIG. 3.

FIG. 4 shows the result of the projection of texture picture 40 onto tesselated representation 80 of 3D object 60. As an example, the vertices of polygon 108 are at (0.0, 0.5), (0.5, 0.0) and (0.5, 0.5). While in this example texture picture 40 was mapped entirely to object 60, it will be apparent to those of skill in the art that this need not be the case and that texture picture 40 can be cropped, if desired, such that only a rectangular region of interest of texture picture 40 is mapped to object 60.

Next, the area occupied by each pixel of the texture on object 60 is determined in uv space from du=1.0/width and dv=1.0/height, where width is the horizontal resolution of the cropped area of texture picture 40 (in pixels) and height is the vertical resolution of the cropped area of texture picture 40 (in pixels) and the area occupied by a polygon pixel is therefore (du * dv).

The next step is to gather data for the points of interest on the object, a point of interest occurring for each intersection between a polygon on the object and a pixel in the cropped area of texture picture 40, referred to herein as a texel. Each point of interest has a weight associated with it, the weight corresponding to the size of the area of intersection relative to the total area of the texel. There are several possible categories of intersection between a polygon and a texel, as shown in FIGS. 5a through 5h, wherein the area of intersection is represented by a hatched polygon.

Figure 5A:
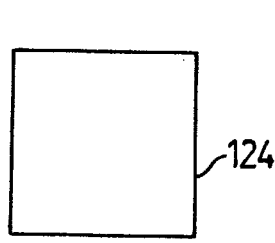
FIGS. 5a through 5m show schematic representations of the categories of intersection which can occur between a triangular polygon in a tesselated polygon mesh and a square texture pixel.
Figure 5A:
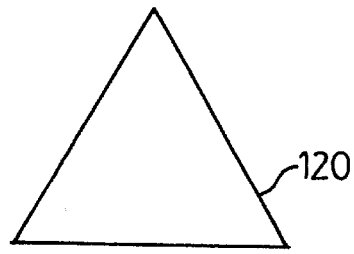
Figure 5B:
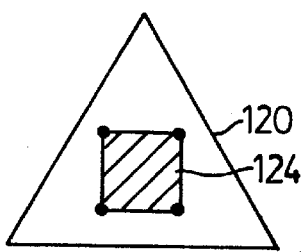

FIG. 5a shows the trivial case of no intersection area between polygon 120 and the area of texel 124 and thus polygon 120 would have a zero weight for texel 124 and no information would be stored for this texel. FIG. 5b shows the other trivial case of a complete intersection between polygon 120 and the area of texel 124 resulting in a weighting of 100%.

Figure 5C:
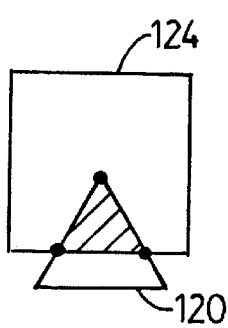
Figure 5D:
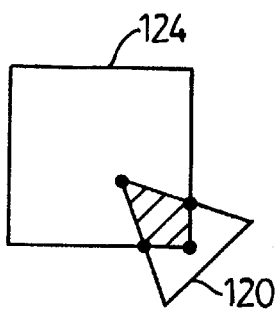
Figure 5E:
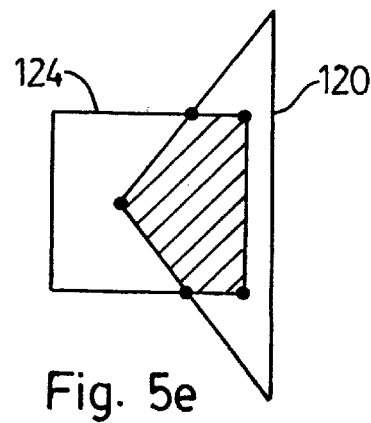

FIGS. 5c, 5d and 5e show examples of a single vertex of polygon 120 falling within the area of texel 124. In such cases, the polygon representing the area of intersection can have three, four or five vertices, as shown respectively in these Figures. To determine the weight for a polygon 120, the area of the intersection is determined by any suitable means. In the present embodiment of the invention, the area of the intersection is determined using the algorithm described by Jon Rokne, on pages 5 and 6 of Section 1.1 of "Graphics Gems II", by James Avro, 1991, published by Academic Press, Inc, San Diego, Calif., the contents of which are incorporated herein by reference, and which only requires the coordinates of vertices of a polygon to be known in order to calculate the area of that polygon.

The vertices of the area of intersection (which is the hatched polygon in the Figures) can be determined in any suitable manner and, in the present embodiment of the invention, this is accomplished using the algorithm described by Mukesh Prasad, on pages 7 through 9 of Section 1.2 of the above-mentioned "Graphics Gems II" reference.

Figure 5F:
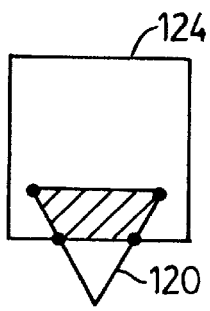
Figure 5G:
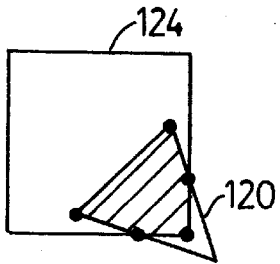

FIGS. 5f and 5g show examples wherein two vertices of polygon 120 fall within texel 124, resulting in the shape of the intersection area having four or five vertices, as shown respectively, and the area of these intersection polygons are determined in the same manner as that described above.

Figure 5H:
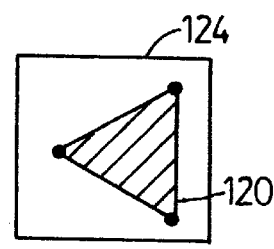

FIG. 5h shows an example of the case wherein all three vertices of polygon 120 fall within texel 124 resulting in the intersection area corresponding to the shape (and area) of polygon 120.

Figure 5I:
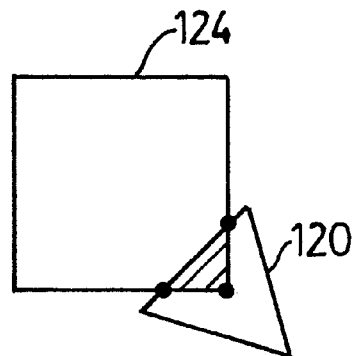
Figure 5J:
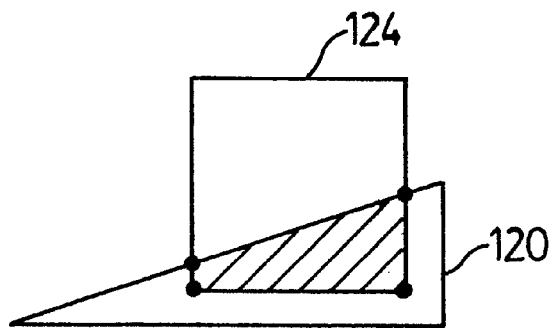
Figure 5K:
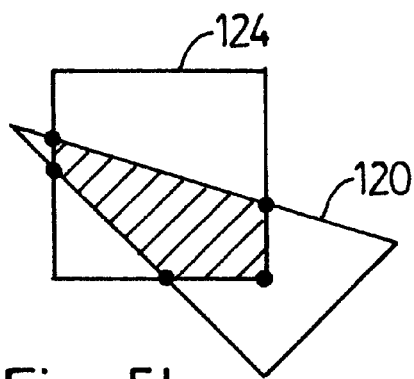
Figure 5L:
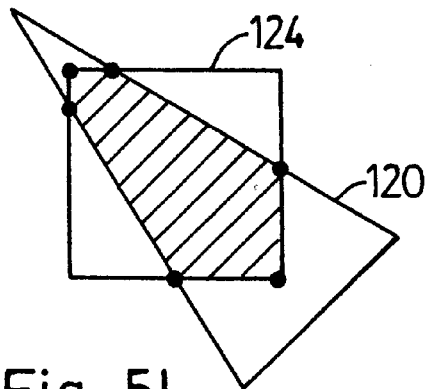

FIGS. 5i and 5j show examples wherein no vertices but one edge of polygon 120 intersects texel 124, resulting in the shape of the intersection area having three and four vertices respectively. FIGS. 5k and 5l show examples wherein no vertices but two edges of polygon 120 intersect texel 124, resulting in the shape of the intersection area having five and six vertices respectively.

Figure 5M:
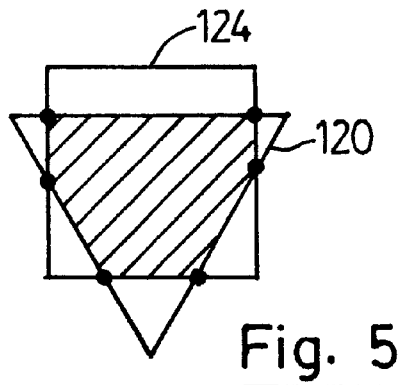

Finally, FIG. 5m shows an example wherein no vertices but three edges of polygon 120 intersect texel 124, resulting in the shape of the intersection area having six vertices.

Figure 6:
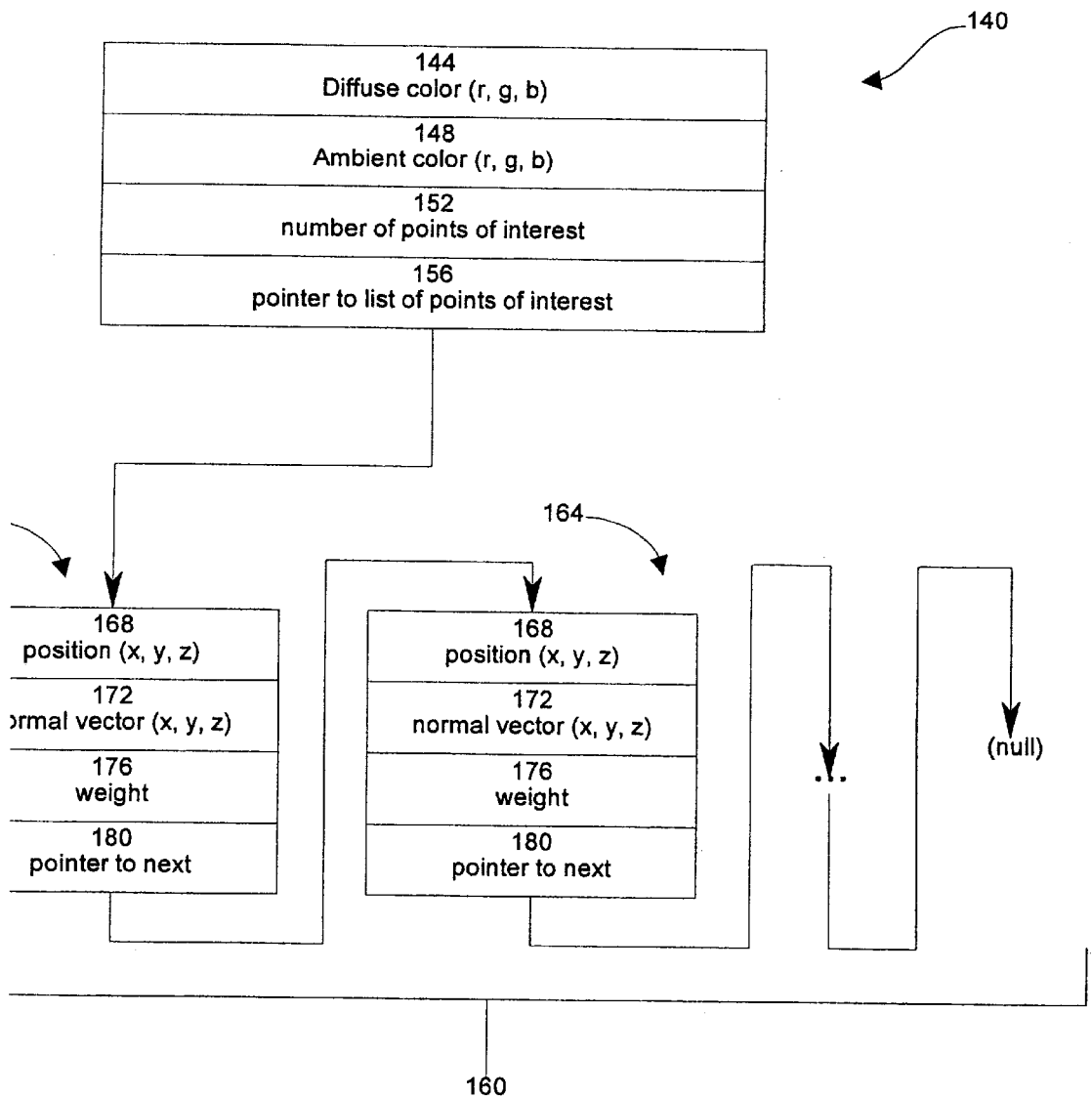
FIG. 6 shows a schematic representation of a data structure employed with an embodiment of the present invention.

A data structure, shown at 140 in FIG. 6, is then created for each texel in the cropped region of texture picture 40, which can comprise the entire texture picture 40 or any rectangular sub-region thereof. Data structures 140 store information relevant to each texel, including information relating to the points of interest for the texel, as described below.

Each data structure 140 stores a Diffuse color value 144 determined for the texel in normalized RGB color space (i.e.—R between 0.0 and 1.0, B between 0.0 and 1.0 and G between 0.0 and 1.0), an Ambient color value 148 determined for the texel in normalized RGB color space, the number 152 of points of interest for the texel and a pointer 156 to a linked list 160 of data structures 164 storing information for each of those points of interest.

As shown, each node 164 in linked list 160 includes a position 168 which is the determined center of the area of intersection between the respective polygon and the texel in xyz coordinate space, a surface normal 172 determined at position 168 in xyz coordinate space, a weight 176, and a pointer 180 to the next node. Linked list 160 is terminated when pointer 180 is a null. The methods of determining the relevant above-mentioned values for each node 164 and data structure 140 are discussed below.

The value for weight 176 in each node 164 is determined as the area of the intersection between the polygon and the texel relative to the total area of the texel. For example, in FIG. 4 the weight for the intersection area between polygon 96 and the upper right hand texel, assuming the vertices of the polygon of intersection are {(0.5, 0.0), (1.0, 0.0), (1.0, 1.0), (0.0, 1.0) and (0.0, 0.5)}, would be determined to be 0.875, calculated as follows $$\text{Weight} = \frac{\text{Area of Intersection}}{\text{Area of Texel}} = \frac{\text{Area of Intersection}}{dudv} =$$

$$\frac{0.5[(0.83 \times 0.66 + 1.0 \times 1.0 + 1.0 \times 1.0 + 0.66 \times 0.83 + 0.66 \times 0.66) - (0.66 \times 1.0 + 0.66 \times 1.0 + 1.0 \times 0.66 + 1.0 \times 0.66 + 0.83 \times 0.83)]}{0.33333 \times 0.33333} = 0.875$$

As will be apparent, the sum of weights 176 of each node 164 for a texel cannot exceed 1.

For triangular tessellation polygons, position 168 is determined as described below. If non-triangular polygons are employed as the tessellation mesh polygons, such as rectangular polygons or the like, any suitable technique for determining position 168 and normal vector 172 can be employed, as will occur to those of skill in the art.

For triangular polygons, the center of the area of intersection is first determined by summing the u component of each vertex in the area of intersection and dividing the result by the number of vertices to obtain the u coordinate of the center and by performing a similar process with the v components to obtain the v coordinate of the center. Next the barycentric coordinates are determined for the center of the area of intersection within the polygon, using the uv coordinate center determined above and the uv coordinates of the vertices of the polygon.

As is known by those of skill in the art, a barycentric coordinate system is one which is relative to a given set of points and a discussion of barycentric coordinate systems is given in chapter 10 of "Geometric Concepts for Geometric Design", Wolfgang Boelun & Hartmut Prautzsch, pub. A K Peters Ltd., (ISBN 1-56881-004-0), in "Coordinate-Free Geometric Programming", Tony Derose, Technical Report 89-09-16, Department of Computer Science and Engineering, University of Washington, Seattle, 1994 and on the "On-Line Computer Graphics Notes" on the World Wide Web, at http://muldoon.cs ucdavisedu/GraphicsNotes/ Barycentic-Coordinates/Barycentric-Coordinates.html, which are published by the University of California at Davis, the contents of each of these publications are incorporated herein by reference. The calculated barycentric center is then used, with the uv and the xyz space coordinates of the vertices of the polygon to obtain the center of the area of intersection in xyz space. This is the position value 168 stored in node 164.

Next, the barycentric coordinates, determined above, of the center are used, with the normals of the polygon vertices to obtain an interpolated surface normal at the determined center, in xyz space. This is the normal vector value 172 stored in node 164.

When the calculation of values for nodes 164 is complete, values 144 and 148, representing the Diffuse and Ambient colors respectively, are determined for data structure 140. Diffuse color 144 is determined from equation 1 in Appendix A wherein: the Blending value is defined for the texel, either globally for the texture picture, on a texel by texel basis or by a combination of both and defines the relative contributions of the material diffuse color and the texel diffuse color to the Diffuse color; the material diffuse color is the diffuse color defined for the object to which the texture is being applied; the pixel color is the color defined for the texel in the texture picture; and the texture diffuse factor is a variable, set in any appropriate manner in the range of 0.0 to 1.0, which is used to adjust the intensity of the Diffuse color as desired.

Similarly, Ambient color 148 is determined from equation 2 in Appendix A wherein: the Blending value is as described above; the material ambient color is the ambient color defined for the object to which the texture is being applied; the texture ambient factor is similar to the texture diffuse factor described above and allows the intensity of the Ambient color to be varied as desired; the pixel color is the color of the texel; and the scene ambient color is a global ambient color which may be defined for the scene. In the present embodiment of the invention, each color is expressed in normalized RGB color space (R, G and B values each between 0.0 and 1.0). In SoftImage|3D, if an object does not have a material explicitly defined for it, a default material (ambient and diffuse colors) is employed.

Once the values in data structures 140, and in their respective nodes 164, have been determined, the points of interest are rendered. Specifically, the scene definition is examined to determine the number of lights and their positions. In the present embodiment of the invention, if no lights are defined for a scene, a default light source is employed, the light source being located at a infinite distance from the scene elements.

In the presently preferred embodiment of the invention, the process for the creation of data structure 140 and nodes 164 and the determination of their respective values is performed on a polygon by polygon basis. Specifically, a rectangular bounding box of texels is determined for a polygon in the tessellation mesh, the bounding box defining those texels which can intersect with a particular polygon. Each of the texels within the bounding box is then considered in turn and, if the texel under consideration intersects with the polygon, a data structure 140 is created, if one does not already exist for the texel, and a node 164 is created with appropriate values and added to the linked list 160 for the texel and value 152, representing the number of points of interest for the texel, is updated in the appropriate data structure 140. When all of the texels in the bounding box for a polygon have been considered, the process is repeated for the next polygon.

Figure 7A:
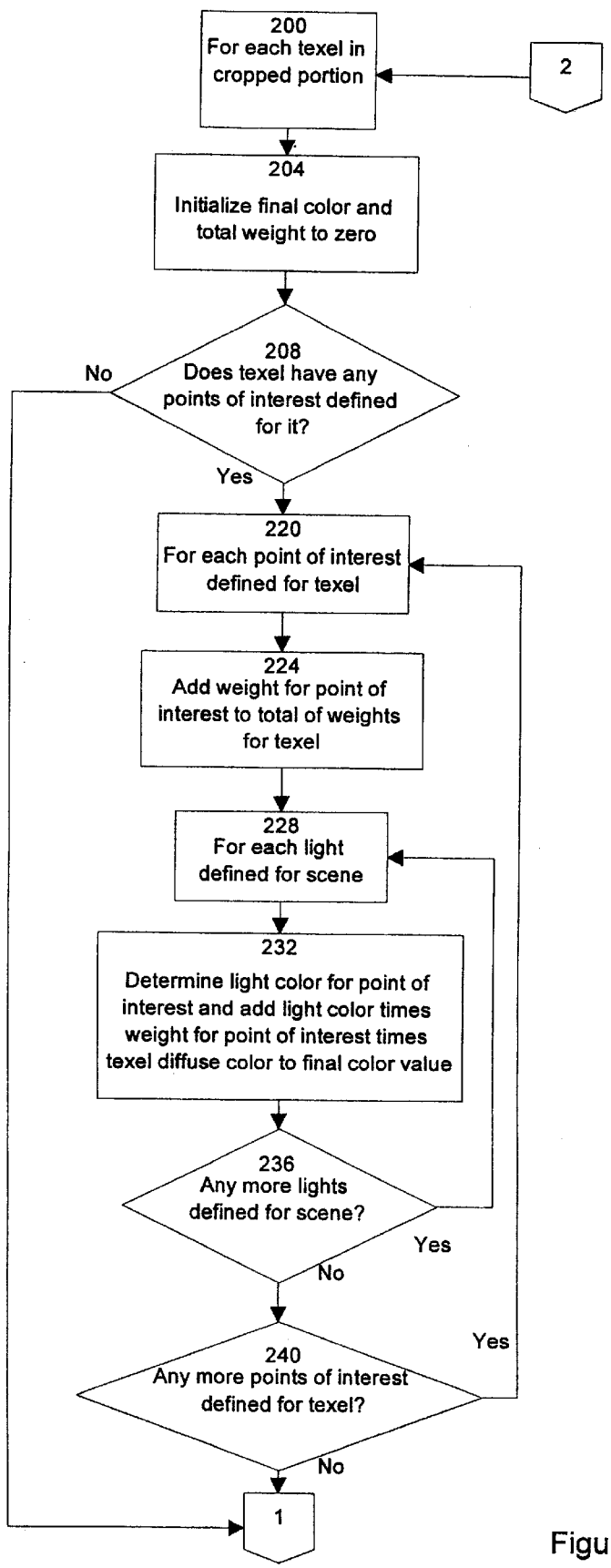
FIGS. 7a and 7b show a flowchart representing a process in accordance with one embodiment of the present invention.
Figure 7B:
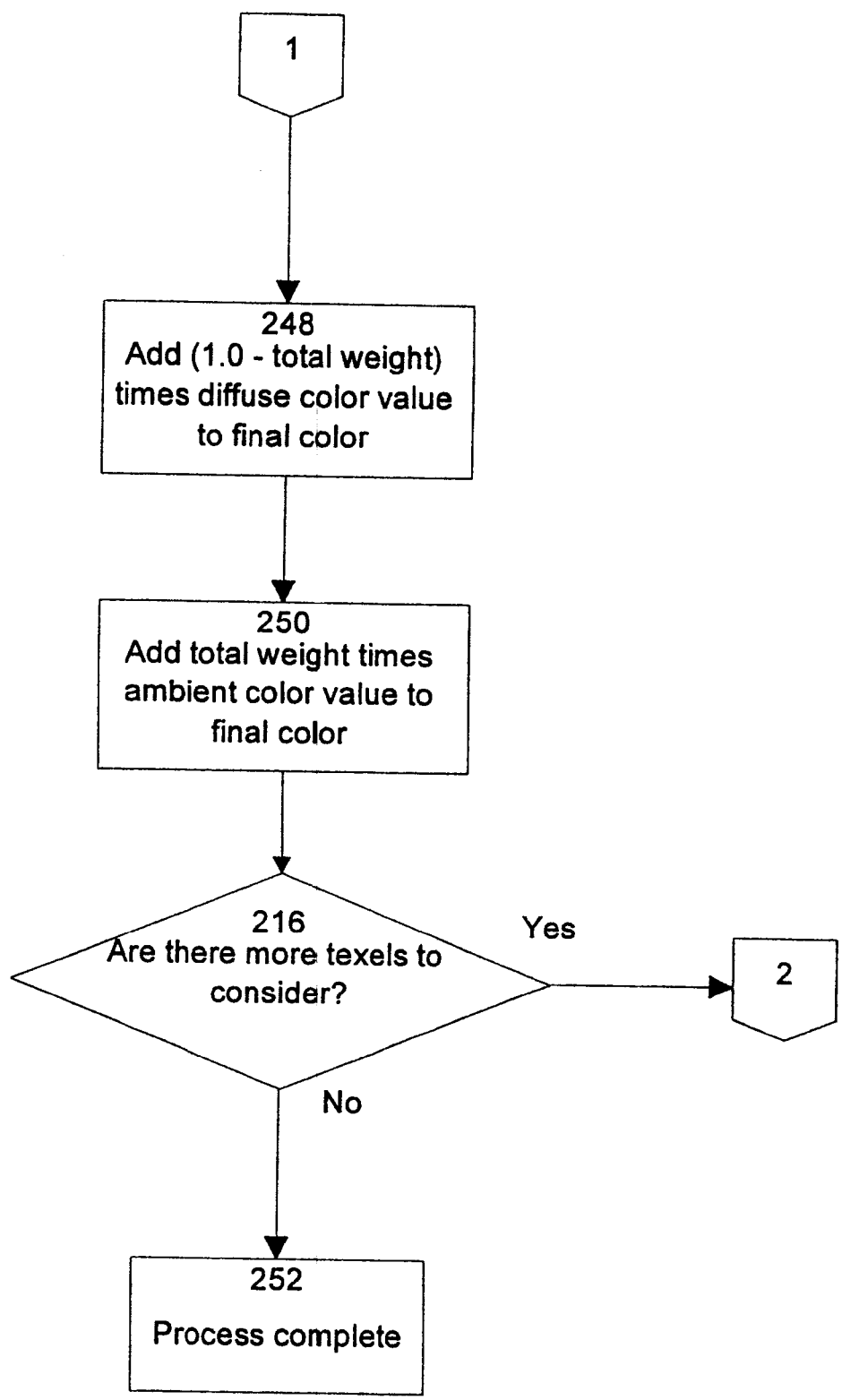

When all polygons have been considered, the rendering process proceeds as shown in FIGS. 7a and 7b. Specifically, each texel in the cropped portion of texture picture 40 for which a data structure 140 has been created is considered in turn. As shown, a first texel is selected at step 200 and, at step 204, the final color and the total weight for the texel are both initialized to zero. At step 208 a determination is made as to whether any points of interest have been defined for the texel. If there are no points of interest defined for the texel, the process proceeds to step 248 in FIG. 7b.

If, at step 208 it is determined that one or more points of interest have been defined for the texel, the process proceeds to step 220, wherein a first point of interest for the texel is selected and the weight 176 determined for that point of interest is accumulated to the total weight value at step 224. At step 228 a first light is selected from those defined for the scene. As mentioned above, if no lights are defined for the scene a default light, at an infinite distance, is employed by the process.

At step 232, the light color is determined at the position 168, using normal vector 172 for the point of interest and the product of this determined light color and the weight 176 and the Diffuse color value 144 is added to the final color value for the texel. At step 236, a determination is made as to whether any lights remain to be considered and, if so, steps 228 and 232 are repeated for each remaining light with the products of the light colors and weight being accumulated (i.e. summed) in the final color value for the texel.

At step 240, a determination is made as to whether any points of interest remain to be considered for the texel under consideration. If points of interest do remain to be considered, the process repeats steps 220 through 240 for each remaining point of interest, in turn.

When all points of interest have been processed for a texel the process proceeds to step 248 wherein the product of Diffuse color value 144 and the difference between one and the total accumulated weight is added to the final color and then the process proceeds to step 250 wherein the product of the total weight and the Ambient color value is added to the final color.

At step 216, a determination is made as to whether all texels with a data structure 140 have been considered. If texels remain to be considered, the process repeats steps 200 through 250 for each texel in turn. Otherwise the rendering process completes at step 252 by replacing the color information stored in each texel of texture picture 40 with the corresponding final color value determined by the process.

Equation 3 in Appendix A shows the calculation of the final color which is used to replace the texel color information in step 252 in more detail. In the equation, "nbp" is the number of points of interest for the texel, "nbl" is the number of lights defined for the scene, Ambient color is Ambient color value 148, Diffuse color is Diffuse color value 144 and light$_l$ is the value of the light for position 168 and normal 172. As mentioned above, in SoftImage|3D colors are expressed as R, G and B values which range from 0.0 to 1.0 and thus, the results of equation 3 are clamped if necessary to be within the range of 0.0 to 1.0, i.e.—red=1.031 is truncated to red=1.0, blue=−0.01 is truncated to 0.0, etc.

Rendering of the final image is then accomplished in any suitable manner, such as with the above-mentioned mental ray rendering engine using the modified version of texture picture 40 which results from this embodiment of the present invention and with the rendering engine configured such that its shading model is deactivated, i.e.—set to "constant" in the case of the "mental ray" rendering engine, so that the contribution of lights in the scene are not considered further by the rendering engine.

As will be apparent to those of skill in the art, by having predetermined the illumination values for texture picture 40, the computational requirements for the rendering engine are reduced. As will also be apparent, modified texture picture 40 is independent of the camera point of view, allowing the point of view to be changed without requiring texture picture 40 to be further modified and without requiring the rendering engine to consider the contribution of the lights defined in the scene.

It should be noted that, in embodiment described above wherein only the contribution of light sources is considered, the present invention does not produce specular information for objects. In many cases, this is not an undue disadvantage as specularities and specular effects are not required.

However, it is contemplated that if specularities are desired, they can be determined by the rendering engine at the time of rendering the image and combined with image information produced in accordance with the present invention, as will be apparent to those of skill in the art, albeit at the cost of an increase in rendering time in comparison to the rendering time of the same image without specularities. If specularities are only desired for a limited number of objects in a scene, this increase in rendering time may not pose a significant problem.

Further, the embodiment described below which evaluates all of the active components of the shade tree defined for the scene will generate specularities, if desired.

The process described above essentially comprises the calculation of information referred to herein as an "illumination map" which represents the contribution of the scene's light sources to the points of interest in the scene and combining the colors of the objects at those points of interest with the illumination map values to obtain new color values for the texture picture. However, the present invention also provides for the storage of the illumination map values to allow pre-rendering of the contribution of the scene's light sources independent of the texture. Specifically, by modifying the process described above, the present invention can produce an illumination map which can subsequently be combined with any texture picture 40 as desired.

To produce an illumination map, the process of FIGS. 7a and 7b, is modified as follows. In step 232 the product of the light color and the weight 176 is accumulated (summed) to the illumination value for the texel. When, at step 240, it is determined that no additional points of interest remain to be considered for the texel, the process proceeds to step 216, rather than to steps 248 and 250 as before. Steps 248 and 250, which deal with the ambient and diffuse contributions, are not required and are omitted in this embodiment. When at step 216 there are no more texels to consider, the process completes at step 252 by storing the resulting illumination values to obtain the illumination map. The calculation of the illumination values for an illumination map is shown in more detail in equation 4 of Appendix A wherein "nbp" and "nbl" represent the same as quantities as above. It should be noted that, in this process texels are merely geometric placeholders which are employed to determine information relating to the intersections which will occur when a texture picture is mapped to the respective objects.

To employ an illumination map when rendering a scene, the illumination values in the illumination map are combined with the texel color of the texels in texture picture map 40, and, optionally, with an ambient color to obtain the rendered color as shown in equation 5 of Appendix A.

Once an illumination map has been determined for a scene, textures can be changed and/or substituted as desired. For example, a scene can be rendered with walls to which a wood grain texture is been mapped. The scene can then be re-rendered, as a different setting in a game for example, with a marble texture mapped to the walls. In each case the same illumination map is employed in the rendering process and thus, once an illumination map has been determined for a scene, the rendering time to render that scene is reduced. It is contemplated that, for rendering engines such as those used in games systems such as the SEGA Saturn, Sony PlayStation, Nintendo 64 or the like, the use of illumination maps will be particularly useful, although the present invention is not limited to such uses.

As mentioned above, in addition to determining the rendered colors for texture mapped objects, the present invention can also be used in rendering non-texture mapped objects. Specifically, in the above-mentioned SoftImage|3D product and many others, objects are rendered from polygon meshes used to represent the object. When such objects are rendered without a texture map projected onto them, the rendering engine determines for each visible polygon in the mesh, the rendered color at each vertex of the polygon, and the polygon's normal vector, and these rendered colors are linearly interpolated across the polygon surface. The linear interpolation of vertex colors across a polygon surface is such a commonly employed operation that rendering hardware is often provided which accepts as inputs the vertex colors and the normal vector and which then determines the rendered colors for the displayed pixels of the polygon. While such rendering hardware can significantly improve the time required to render an object, the rendering engine still must determine the vertex colors for each visible polygon and this can represent a significant computational requirement on many systems.

Accordingly, in another embodiment of the present invention an illumination map can be determined for rendering objects represented as polygons. This process commences with the user selecting the object or objects for which an illumination map is to be determined. In SoftImage|3D, this selection can be performed from a schematic view of the hierarchy of objects in a scene, or by selecting an "All Objects" mode. Of course any other suitable method of selecting objects for consideration can be employed as desired. Once the objects to be considered are selected, the process continues as described below.

In this embodiment, which is similar to the texture mapping embodiment described above, the points of interest are the vertices of each polygon and the illumination map contains an illumination value for each of these vertices. This illumination map can be combined with the vertex colors to obtain a final color or can be stored independently of the vertex colors for subsequent use. As with the embodiment described above, the determination and use of the illumination map reduces the computations which must be performed by the rendering engine, thus reducing the rendering time or allowing a more complex scene to be rendered in the same time.

Figure 8:
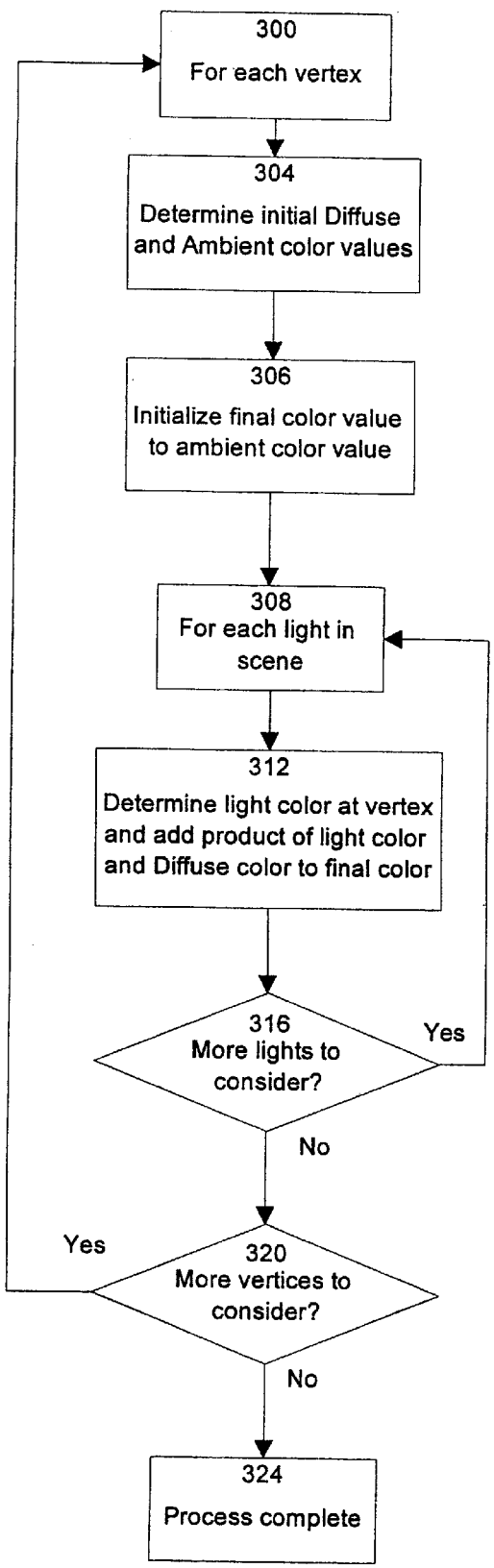
FIG. 8 shows a flowchart representing a process in accordance with another embodiment of the present invention.

The determination of the final color values of the vertices of polygon mesh objects is shown in FIG. 8. Specifically, at step 300 a first vertex is selected and, at step 304, the initial diffuse and ambient colors of the vertex are determined. The initial diffuse value is the diffuse color defined for the material from which the object is composed. Similarly, the initial ambient color is the product of the ambient color for the material and the scene ambience color. At step 306, the final colour value is initialized to the ambient color value. Next, at step 308 a light in the scene is selected and, at step 312, the light color for the selected light at the vertex is determined, multiplied with the material's diffuse color value and is added to the final color.

At step 316 a determination is made as to whether any lights remain to be considered and the process reverts to step 308 if there are still lights defined for the scene which have not yet been considered. If all lights have been considered, the process proceeds to step 320 wherein a determination is made as to whether any vertices remain for processing. If one or more vertices remain for processing, the process reverts to step 300. Once all vertices have been processed, the process is complete at step 324 wherein the final color values are appropriately stored.

Storage of the final color values can be in a temporary file, in the definitions of the polygon meshes or as the definition of a new material to which vertices of the mesh polygons can be assigned or in any other suitable manner as will occur to those of skill in the art.

As will be apparent, the process of FIG. 8 is similar, albeit simpler, to that of FIGS. 7a and 7b used for texture mapped surfaces. Further, as with the process of FIGS. 7a and 7b, this embodiment of the present invention can also be easily modified to produce an illumination map, rather than final color values. Specifically, to produce an illumination map the initial ambient color value in step 304 is set to zero and the illumination values, calculated with equation 6 in Appendix A, are stored at step 324 as an illumination map which can be used subsequently to produce final color values for polygon vertices, using equation 7 in Appendix A.

As mentioned above, in another embodiment of the present invention, instead of determining the illumination information by considering only the contribution of each light source to the point of interest under consideration, an evaluation of the active components of the entire shade tree for the scene is employed. Specifically, the active components of the "shade tree" are evaluated at a point of interest by "firing" a ray along the surface normal to the point of interest. As will be apparent to those of skill in the art, like the embodiment described above, the resulting illumination value can represent the final color, including the color and/or texture, or can be subsequently combined with the object color or a texture to obtain a final color. Ray tracing and the evaluation of shade trees is well known, and will not be discussed in farther detail herein.

Figure 9:
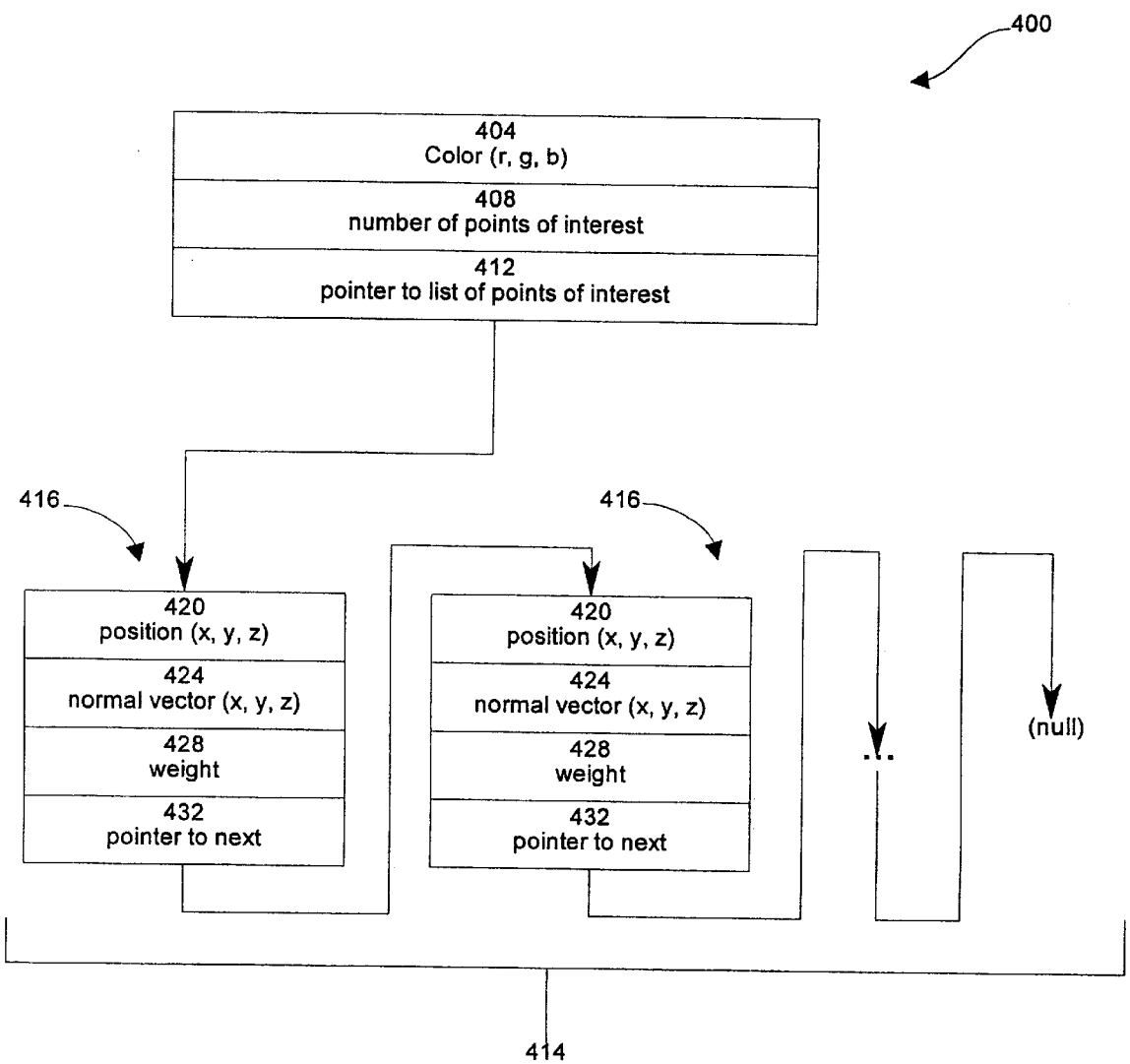
FIG. 9 shows a schematic representation of a data structure employed with another embodiment of the present invention.

The illumination value determined by the full evaluation of the shade tree will, in the case of the "mental ray" rendering engine, also include the effects of any active "mental ray shaders" which are applied to the scene to define materials, atmosphere, or other effects. The determination of the illumination value by a full evaluation of the active components of a shade tree is quite similar to that discussed above and the required data structure is shown in FIG. 9 and the process is shown in FIG. 10.

As was the case for the light source contribution-only embodiment described above with reference to FIG. 6, FIG. 9 shows the data structure 400 which is created for each texel in the cropped region of texture picture 40. Each data structure 400 stores a color value 404 determined for the texel in normalized RGB color space, the number 408 of the points of interest for the texel and a pointer 412 to a linked list 414 of data structures 416 storing information for each of these points of interest.

As shown, each data structure 416 for a point of interest includes a position 420 which is the determined center of the area of intersection between the respective polygon and the texel in xyz coordinate space and a surface normal 424 determined at position 420 in xyz space and which is the normal along which the ray is "fired" in the ray tracing operation. Also, data structure 416 includes a weight 428 and a pointer 432 to the next data structure 416 in linked list 414.

Figure 10A:
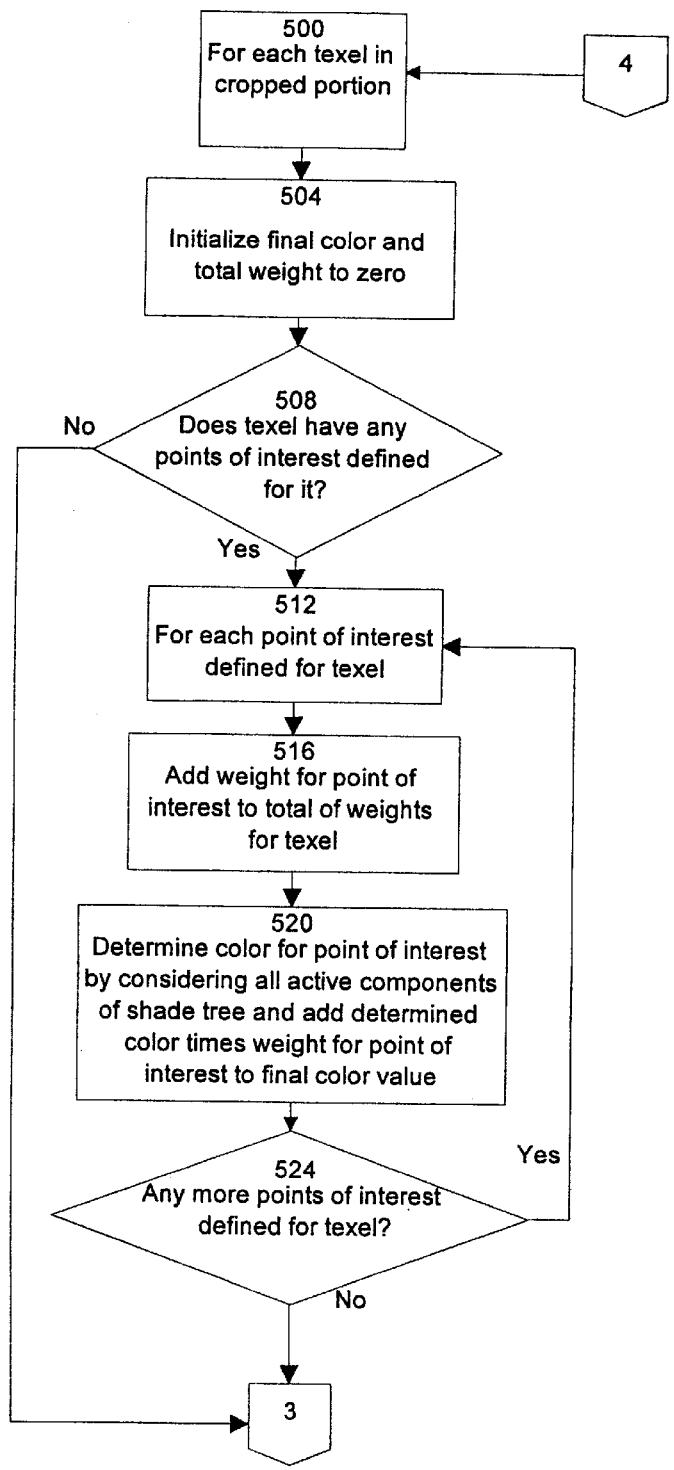
FIGS. 10a and 10b show a flowchart representing a process in accordance with another embodiment of the present invention.
Figure 10B:
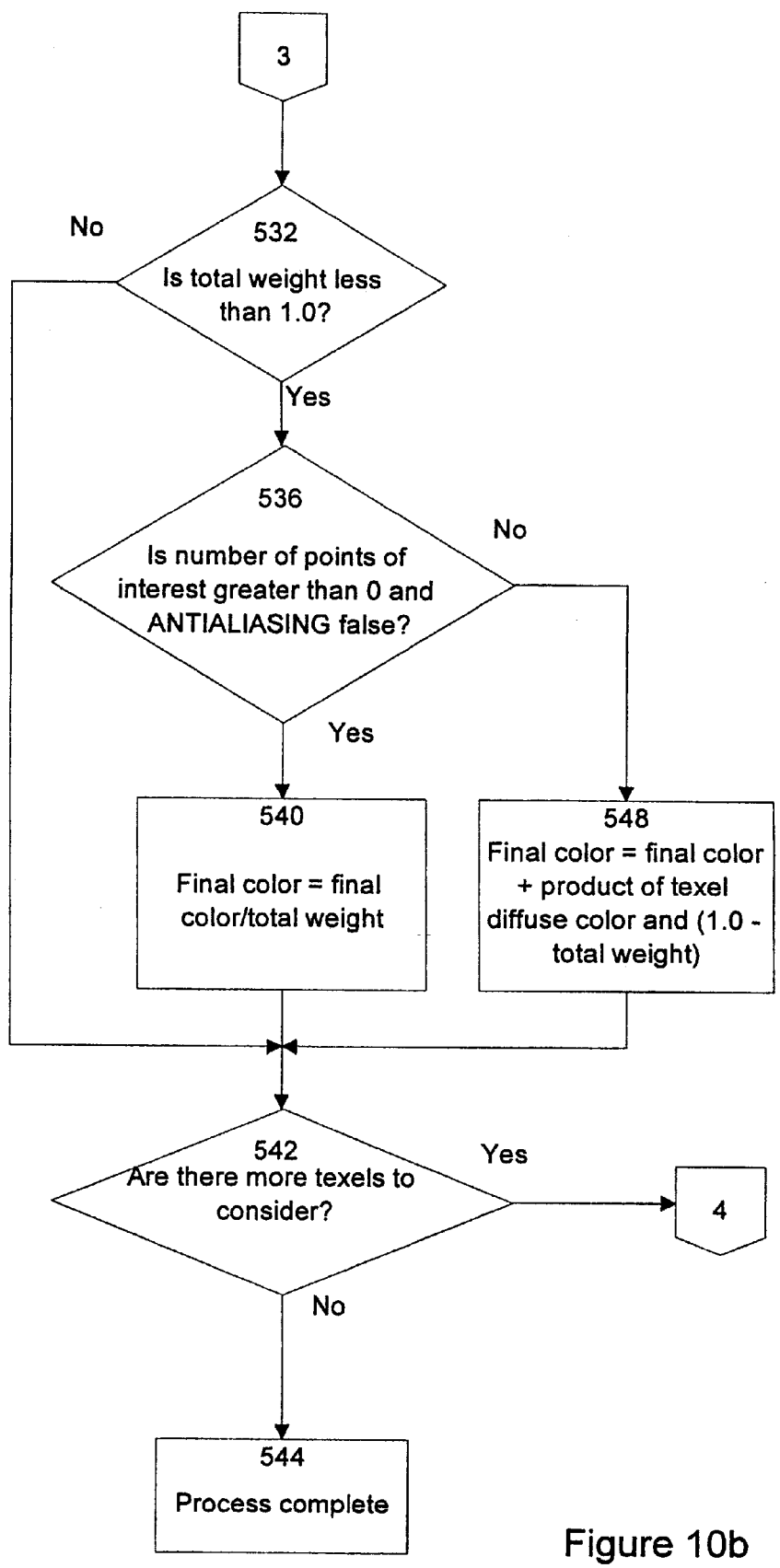

The process to produce the illumination map by evaluating the active components of the shade tree is shown in FIGS. 10a and 10b. In this embodiment, each texel in the cropped region of texture picture 40 for which a data structure 416 has been created is considered in turn. As shown, a first texel is selected at step 500 and, at step 504, the final color and the weight value are initialized to zero. At step 508, a determination is made as to whether the texel has any points of interest defined for it. If there are no points of interest, processing proceeds to step 532, described below.

If the texel under consideration has one or more points of interest defined for it, processing continues by considering each point of interest in turn. At step 512 a first point of interest is selected and the weight associated with the point of interest is summed to the total weight value at step 516. At step 520, the color at the point of interest is determined by evaluating all of the active components of the shade tree and the product of the determined color and the weight is summed to the final color value. At step 524 a determination is made as to whether additional points of interest remain to be considered. If such points of interest remain, steps 512 through 524 are repeated for each point of interest. When all points of interest have been considered, a determination is made at step 532 as to whether the total weight is less than 1.0. If this condition is false, the process continues at step 542, as described below, and if this condition is true, the process continues at step 536 wherein a determination is made as to whether the total number of the points of interest for the texel is greater than zero and if an ANTIALIAS flag is false.

The ANTIALIAS flag allows a user to define whether the process should include the contribution of the original diffuse texel color in the final value and is set prior to commencing the process. It will be apparent to those of skill in the art that such an ANTIALIAS flag can also be employed with the embodiment of the present invention described above, with reference to FIGS. 7a and 7b, if desired. The method of implementing such an ANTIALIAS feature is essentially identical to that described immediately above and will be apparent to those of skill in the art.

If both conditions at step 536 are true, the process proceeds to step 540 wherein the final color is set to the final color value divided by the total weight. If either condition at step 536 is false, then the process proceeds to step 548 where the final color is set to the final color plus the product of the diffuse color of the texel and the difference between 1.0 and the determined total weight. In either case, the process then proceeds to step 542 where a determination is made as to whether additional texels remain to be considered. If one or more texels have yet to be considered, steps 500 through 548 are repeated for each remaining texel. When all texels have been considered, the process is complete at step 544.

As before, storage of the final color values can be in a temporary file, in the definitions of the polygon meshes or as the definition of a new material to which vertices of the mesh polygons can be assigned or in any other suitable manner as will occur to those of skill in the art.

Figure 11:
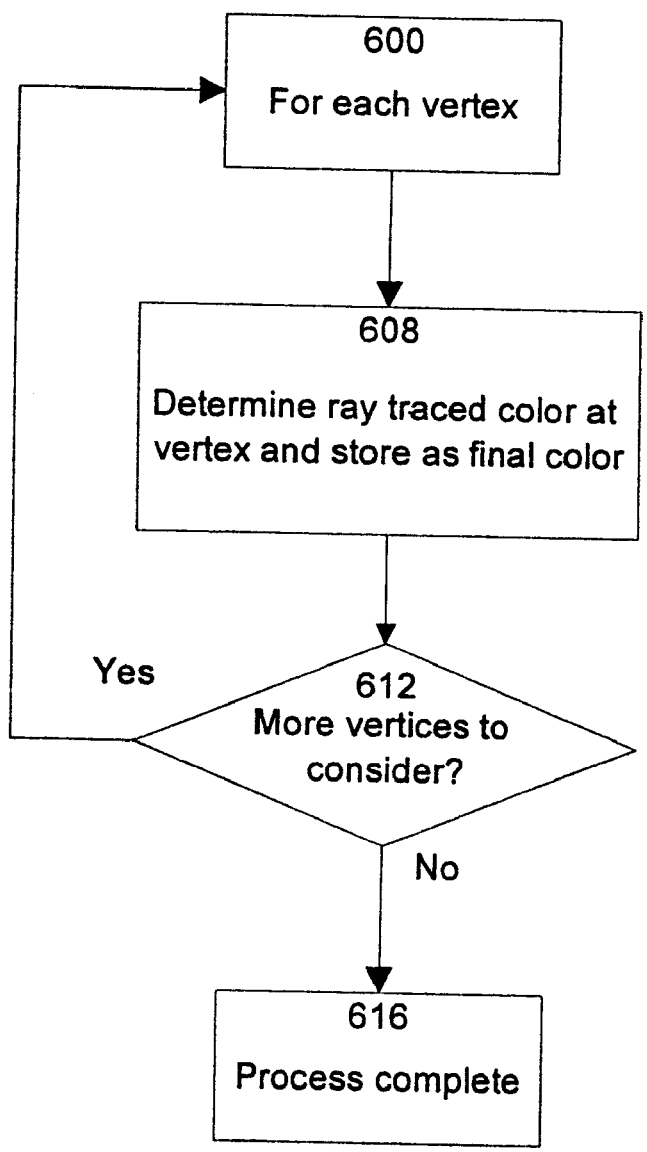
FIG. 11 shows a flowchart representing a process in accordance with another embodiment of the present invention.

FIG. 11 shows the modification to the process of FIG. 10 to determine an illumination map of vertex colors by ray tracing for objects represented as polygon mesh. As shown, the process commences at step 600 with a first vertex being selected for consideration. The final ray traced color is determined at step 608 and the process repeats steps 600 through 612 until all vertices have been processed after which the process completes at step 616.

It is contemplated that, in some circumstances, it may be desired to combine the process of FIGS. 7a and 7b with the process of FIG. 10 and to add a test to the process, prior to determining the illumination value, to determine if an evaluation of the active components of the shade tree for the scene is to be performed for this determination or not.

As will be apparent, the present invention provides a system and method of determining an illumination map and using illumination maps to reduce the computation required to be performed by the rendering engine to render the scene, thus reducing the rendering time. The illumination map can either be combined with texture picture or material color information for use therewith or stored independently of a texture picture or material color information and subsequently combined therewith as desired.

The above-described embodiments of the invention are intended to be examples of the present invention and alterations and modifications may be effected thereto, by those of skill in the art, without departing from the scope of the invention which is defined solely by the claims appended hereto.

APPENDIX A (1) Diffuse = ((1.0 − Blending) × material diffuse color) + (Blending × texture diffuse factor × pixel color)

(2) Ambient = (((1.0 − Blending) × material ambient color) + (Blending × texture ambient factor × pixel color)) × scene ambient color)

(3) final colour = $\sum_{s=0}^{nbp-1}$ Weights × Ambient Colour +
$\sum_{s=0}^{nbp-1}\sum_{l=0}^{nbl-1}$ Diffuse Colour × weights × light color$_l$ +
$\left(1.0 - \sum_{s=0}^{nbp-1} \text{Weights}\right) \times$ Diffuse Colour (4) illumination value = $\sum_{s=0}^{nbp-1}\sum_{l=0}^{nbl-1}$ weight$_s$ × lightcolor$_l$ (5) final color = illumination value × pixel color [+ambient color]

(6) illumination value = $\sum_{l=0}^{nbl-1}$ light color$_l$ (7) final color = ambient color + illumination value × diffuse color

I claim:

1. A method of producing an illumination map for at least one object in a scene to be rendered, the object to be texture mapped and the object being represented as a mesh of polygons, comprising the steps of:
   (i) selecting a texture picture to be mapped to said object and representing said texture picture and said mesh of polygons in a common coordinate system;
   (ii) determining the location of, area of and weight of the intersection between each pixel in said texture map and each polygon in said polygon mesh, the weight corresponding to the proportion of said area of intersection relative to the total area of said pixel;
   (iii) for each determined area of intersection, determining the product of illumination information at said determined location of intersection and the weight of said area of intersection;
   (iv) summing each product determined in step (iii) for each respective pixel to obtain an illumination value; and
   (v) storing said illumination value for each said pixel.

2. The method of claim 1 wherein said illumination information in step (iii) is determined by evaluating all active components within a shade tree for said scene.

3. The method of claim 2 wherein said selected texture picture comprises geometric placeholders without color information and in use, said stored illumination values are combined with another selected texture picture which includes color information to obtain final color values.

4. The method of claim 2 wherein said illumination in step (iii) is determined by determining the sum of the product of the contribution of each light source defined for said scene at said determined location of intersection and the weight of the area of intersection, and in step (iv) said illumination value is obtained by summing each said sum of products.

5. The method of claim 4 wherein in step (iii) the product is further multiplied by a diffuse color value representing a desired blend of the diffuse color of the texel pixel and the diffuse color of the object prior to being summed and in step (iv) said illumination value has added to it the product of the difference between the total determined weights and the total area of said pixel and said diffuse color and an ambient color value representing a desired blend of the ambient color of the texel pixel and the ambient color of the object and in step (v) the stored illumination value represents a final color.

6. The method of claim 5 wherein said stored illumination values are stored by replacing color values in said texture picture.

7. The method of claim 4 wherein said selected texture picture comprises geometric placeholders without color information and in use, said stored illumination values are combined with another selected texture picture which includes color information to obtain final color values.

8. The method of claim 1 wherein said mesh of polygons comprises a tesselated polygonal mesh.

9. A method for producing an illumination map for an object in a scene to be rendered, said object being represented as a mesh of polygons, the method comprising the steps of:
   (i) selecting said object;
   (ii) determining the vertices and vertex normals for each polygon in said mesh of polygons for said object;
   (iii) determining for each vertex of each polygon an illumination value by determining the light color for each light defined for said scene at said vertex with the corresponding vertex normal and summing said determined light colors for each vertex,
   (iv) storing said illumination value for each vertex; and
   (v) calculating a final color value by initializing said final color value to an ambient color value defined for said object and computing the product of said illumination value and a diffuse color defined for said object, and adding said ambient color value to said product.

10. A method according to claim 9 wherein in step (iii) the illumination value is determined by evaluating the active components of a shade tree for said scene.

11. The method of claim 9 wherein said illumination values are stored in the definition of said mesh of polygons.

12. A The method of claim 9 wherein said illumination value is stored in the definition of diffuse colors for said object.

13. The method of claim 9 wherein a final color for each vertix is subsequently obtained from the product of said stored illumination value and a diffuse color defined for said object.

14. A system for producing illumination maps for rendering images from a scene description, comprising:
   means for determining from a scene definition a total number and a location for each light source defined in the scene;
   means for determining from said scene definition a position for an object in said scene and representing said object as a tessellated polygon mesh;
   means for determining a weight of an intersection between each pixel in said texture map and each polygon in said polygon mesh, the weight corresponding to a proportion of said area of intersection relative to a total area of said pixel;
   means for determining illumination values at each said location of intersection in accordance with said weights and contributions from said light sources at each said location of intersection; and
   means for storing said illumination values in an illumination map associated with said scene.

15. A system according to claim 14 wherein said means to determine an illumination value performs an evaluation of the active components of a shade tree for said scene.

16. The system according to claim 14, wherein said means for determining illumination values comprises means for determining said illumination values in accordance with said weights and color information defined for said object.

* * * * *